J. A. OBERMAIER.
GRAPHIC METER AND THE LIKE.
APPLICATION FILED OCT. 13, 1917.

1,282,621.

Patented Oct. 22, 1918.
3 SHEETS—SHEET 1.

Inventor
John A. Obermaier
By Brown, Hanson & Boettcher
Attorneys

J. A. OBERMAIER.
GRAPHIC METER AND THE LIKE.
APPLICATION FILED OCT. 13, 1917.
1,282,621.
Patented Oct. 22, 1918.
3 SHEETS—SHEET 2.
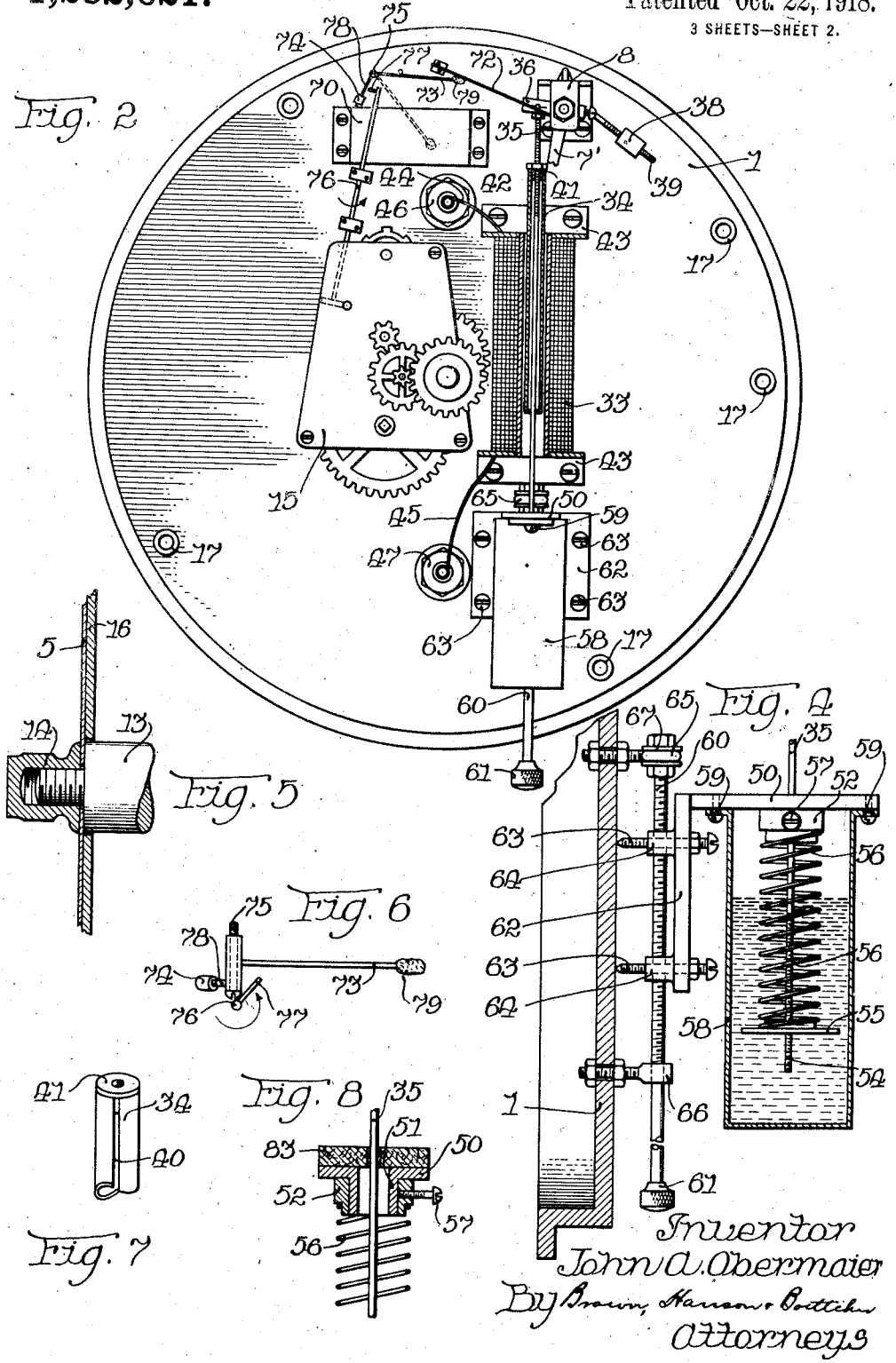

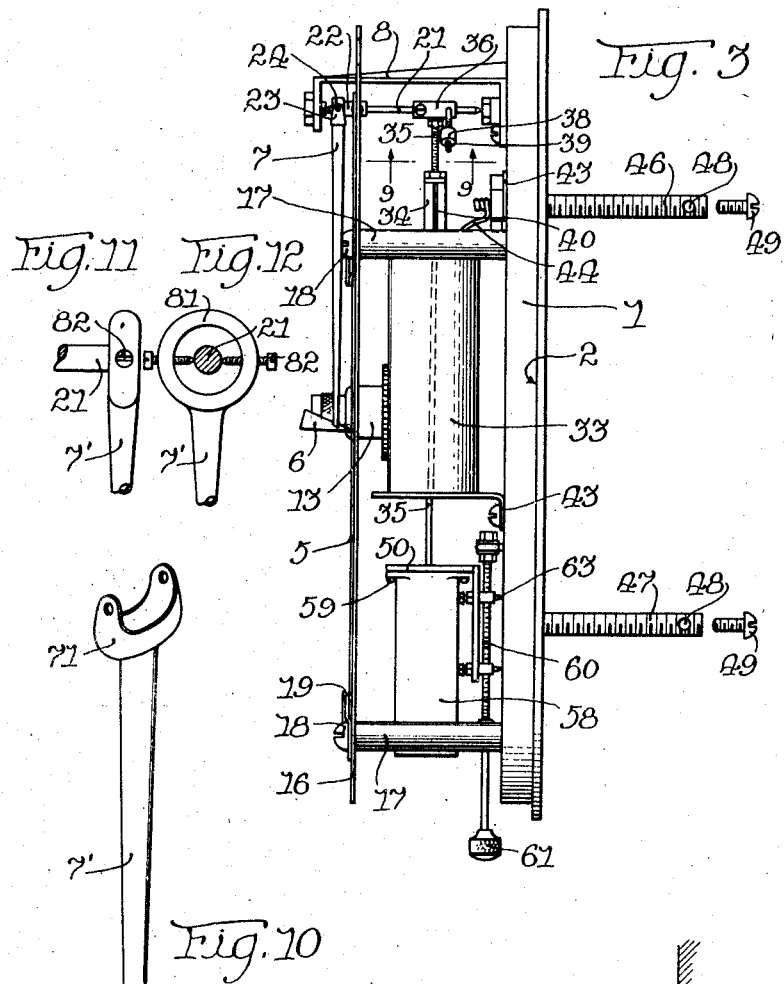
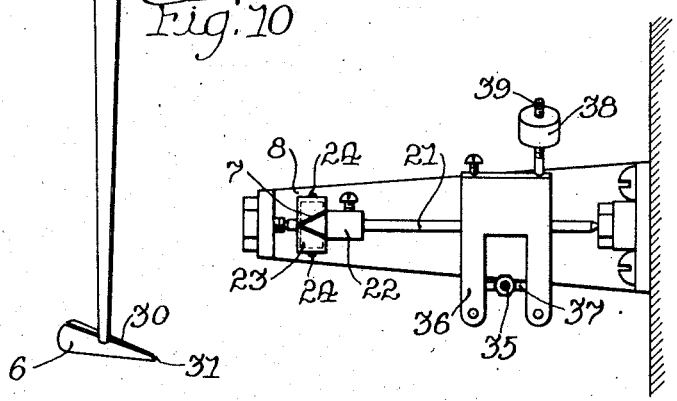

UNITED STATES PATENT OFFICE.

JOHN A. OBERMAIER, OF CHICAGO, ILLINOIS.

GRAPHIC METER AND THE LIKE.

1,282,621.

Specification of Letters Patent.  Patented Oct. 22, 1918.

Application filed October 13, 1917. Serial No. 196,381.

*To all whom it may concern:*

Be it known that I, JOHN A. OBERMAIER, a citizen of the United States, residing at Chicago, in the county of Cook and State of Illinois, have invented a certain new and useful Improvement in Graphic Meters and the like, of which the following is a full, clear, concise, and exact description, reference being had to the accompanying drawings forming a part of this specification.

In order to preserve a continuous record of the readings of a meter or other indicating device, it is customary to provide a pen or stylus, moved in accordance with the indicator and a record sheet upon which the pen or stylus makes a mark.

When a continuous record is to be made of the variations of the indicator, the record sheet is advanced usually at a constant rate per unit of time.

Due to pen friction, unbalanced condition of the parts of a meter or indicating element, lack of power of the operating parts for the indicator and features of poor design, meters of this type have heretofore not proven as reliable and accurate as is required for many purposes. The above is particularly true with respect to meters for measuring small quantities or small variations accurately.

The object of my invention is to provide a meter of improved design and construction which shall be reliable and accurate in measuring relatively small quantities and small variations of such quantities.

Specific objects of the invention are to provide an improved form of pen, to provide an improved form of indicating device, to provide an improved guiding and calibrating spring and to combine the same with a dashpot, to provide an improved form of guiding and supporting device for the plunger rod and to provide the same with a zero setting device operable from the outside of the casing and to provide other specific improvements such as will be apparent from the following specification.

In the accompanying drawings—

Fig. 2 is a front elevation of the working parts of the meter showing the solenoid, the guide and the dashpot in longitudinal section;

Fig. 3 is right side elevation of the meter with the cover removed;

Fig. 4 is a left side elevation on an enlarged scale of the dash pot and mounting shown in Fig. 2;

Fig. 5 is a fragmentary detail section showing the manner of attaching the movable dial or record sheet to the main arbor of the time controlled element;

Fig. 6 is a fragmentary plan view of the automatic feeding mechanism;

Fig. 7 is a fragmentary perspective view of the upper end of the solenoid core;

Fig. 8 is a modified form of guide for the stem of the solenoid core shown in section;

Fig. 9 is a section taken on the line 9—9 of Fig. 3;

Fig. 10 is a perspective view of the stylus or inking pen;

Fig. 11 is a side elevation of the ink receiving funnel at the top of the pen shaft, this form being a modification; and Fig. 12 is a front elevation of the same.

Figure 1:
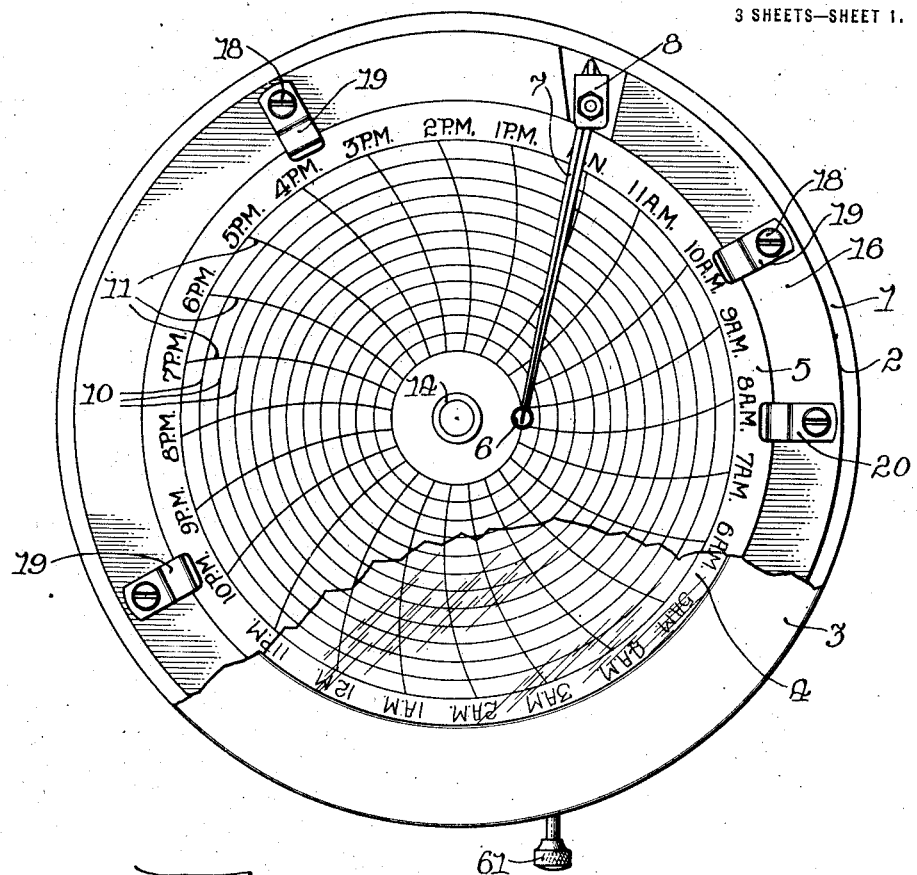
Figure 1 is a front elevation of the meter with a part of the casing broken away to reveal the guiding means for the movable dial or recording surface.

The meter shown in Figs. 1 to 3 comprises a base plate 1 having a shoulder 2 adapted to receive an outer shell or casing 3 which may be of a more or less ornamental style. The outer casing 3 has a suitable aperture over the face of the record chart or dial which is preferably covered with a glass disk 4 to expose the chart 5 upon which a record is made by the pen 6 which swings on the pen arm 7 pivoted in the bracket 8 which is mounted upon the base plate 1. The record sheet 5 which is commonly termed a chart is suitably calibrated, the circles 10 representing current strength or other quantities to be measured and the arcuate lines 11 representing units of time elapsed. The record sheet 5 is attached to a central arbor 13 by means of a clamp nut 14 as shown in Fig. 5. The arbor 13 is turned by means of the clock mechanism 15 for advancing the chart in accordance with the progress of time.

The chart 5 lies flat against a platen member 16 which is supported from the base plate 1 by means of suitable posts 17, the platen being held by means of the screws 18.

Spring guiding clips 19 are held under the screws 18 and serve to guide the edge of a chart or dial 5 about the periphery thereof. I also place a guiding clip 20 along the edge of the chart or dial in such position as to guide the paper at the point where the pen 6 engages the same, as this is the point where support is most needed.

The pen arm 7 with its pen or stylus 6 is hung or suspended upon a rocking shaft 21 by means of a collar 22. The upper end of the arm 7 comprises a yoke 23 adapted to be pivoted upon diametrical pins 24 to the collar 22. The transverse pivot 24 is so placed with respect to the plane of the chart or dial 5 that the center of gravity of the pen arm and pen lies slightly out of the vertical line passing through the pivot member 24 so that there is a small pressure due to gravity of the pen 6 against the chart or dial 5.

The manner of feeding ink to the pen point or stylus and the manner of constructing such a point or stylus have always been difficulties of the most serious nature. If the pen point is made fine it will scratch the paper and the ink will dry up so that no trace or record is left. If the pen point is made large enough to insure a supply of ink there is always a tendency for the chart or dial to become blotted and smeared with ink. This is due to the fact that surface attraction and capillary action generally keep on a flow of ink after it is once established.

The pen point 6 is constructed in the form of a hollow cone made of thin sheet metal having a narrow slit 30 better shown in Fig. 10 where the edges of the sheet metal meet. It is to be understood that the point 31 is not circular—on the contrary it is a U-shaped or V-shaped face or point of minute proportions. It is well known that water and many other liquids which wet the walls of the containing vessel move by capillary attraction to a point of lesser diameter in a capillary tube. This property is made use of in the pen of my invention and so long as ink remains within the pen 6 it will appear at the point 31 giving a fine even line upon the chart 5.

The rocking shaft 21 is controlled by the solenoid 33 through the medium of the solenoid core 34, stem 35 to which the solenoid core 34 is attached, as will be described later, and rocking lever 36 to which the stem 35 is pivoted by a pin 37 which is mounted on one end of the lever 36 parallel to the rocking shaft 21. An adjustable counterbalancing weight 38 is mounted upon a stem 39 attached to the other end of the rocking lever 36. The rocking lever 36 is inclined to the horizontal when the arm 7 is in zero position. Thus the leverage of the core 34 upon said arm increases slightly as the core moves into the solenoid. The core 34 extends for about two-thirds of its length into the solenoid 33 when the parts are in the position shown in Fig. 2. The arm 39 upon which the counterweight is mounted is also inclined to the horizontal as shown in Fig. 2.

The solenoid core 34 is formed of a sheet of soft sheet iron or transformer steel, preferably silicon steel, rolled into a cylinder with a slit 40 longitudinally thereof to prevent loss by eddy currents. The upper end of the core 34 is attached to a collar 41 which is threaded upon the upper threaded end of the stem 35 and held in place by a jam nut 42 also threaded on said stem.

The solenoid 33 is mounted upon the base plate 1 by means of the heads 43 which are attached by screws to said base plate. The terminal wires 44 and 45 are connected to terminal studs 46 and 47 which are connected to but insulated from the base plate 1 and form suitable means for mounting the instrument upon the switchboard or the like. At the rear end of the studs 46 and 47 binding posts or terminal means are provided by means of the transverse holes 48 and the binding screws 49 which are threaded into the ends of the studs.

It is highly important to keep the plunger 34 and connected parts out of frictional contact with the walls of the solenoid or other adjacent parts to maintain accuracy of the meter. The stem 35 extends down below the end of the solenoid through a bracket 50 which has a hollow boss 51 upon which a collar 52 is mounted. The lower end of the stem 35 is threaded as shown at 54, and a threaded head 55 is mounted on said stem, said head providing attachment for the lower end of the spring 56. The upper end of the spring 56 is connected to the collar 52.

The spring 56 serves as a calibrating spring for opposing motion of the solenoid core 34 and connected parts. To increase the spring tension the collar 52 is loosened from the lug 51 by turning a set screw 57 to release the collar 52 and thereafter the head 55 may be turned on the screw threads 54 to move the head 55 with respect to the supporting bracket 50. The collar 52 is thereafter attached by means of the set screw 57.

The opening through the hollow lug 51 on the bracket 50 is made large enough so that the stem 35 may move freely therethrough without contact. The spring 56 in addition to serving its function as a calibrating spring prevents contact of the stem 35 with the opening in the bracket 50. The bracket 50 is so placed that the opening therein is in line with the bore of the solenoid 33 so that the spring 56 accurately centers the stem 35 to maintain the core and the stem completely out of frictional engagement.

A cup 58 partly filled with oil serves as a dashpot for steadying the motion of the stem and solenoid and therefore steadies the pen and pen arm 6—7. The cup 58 is preferably fastened to the bracket 50 by means of the screws 59 which fit in bayonet slots on the flanges of the cup 58.

The bracket 50 is mounted upon a screw threaded stem 60 for movement up and down to adjust the same for the zero position. The stem 60 has a knurled button or head 61 which extends outside of the casing 3 as is shown in Fig. 1 so that adjustment for zero may be made without removing the casing. The vertical portion 62 of the bracket 50 is formed of a plate which has the set screws 63 threaded therein, these set screws being four in number mounted near the edges of the plate for leveling up and alining the bracket with the solenoid 33. The threaded adjusting stem 60 threads into the lugs 64 on the base 62 of the bracket 50. The stem 60 in turn is mounted for rotation in an upper bearing 65 and a lower bearing 66 mounted upon the base plate 1, the stem 60 being provided with collars 67 to prevent longitudinal movement of the same.

In Figs. 2 and 6 I have indicated the manner in which ink may be fed automatically from the reservoir 70 to the pen 6 through the medium of the clock mechanism 15.

Where ink is thus to be fed periodically, the stem 7' as shown in Figs. 2, 10, 11 and 12, is preferably made round and hollow and is provided at its upper end with a hollow funnel, 71, into which the ink is adapted to be deposited. In such case the rear end of the pen 6 is preferably closed although this is not strictly necessary.

In order to deposit the ink within the funnel 71 an ink conducting member 72 is so supported from the base plate 1 that it projects over the funnel 71 but out of actual contact therewith, thereby preventing frictional engagement of these parts. The conductor 72 may be made of metal or fiber or it may consist of a wick with a wire stiffening device therein for conducting the ink to the interior of the funnel 71. A dipping arm 73 provided with a counterweight 74 which normally keeps the dipping arm in raised position is pivoted upon a pin 75 mounted on the base plate 1. A shaft 76 driven by the clock 15 has an arm 77 which periodically engages the weight arm 78 causing the dipper arm 73 to dip into the ink reservoir 70. After the operating arm 77 passes the weight arm 78 the dipper arm 73 rises due to the counterbalancing weight 74 and causes the absorbent pad or dipper 79 to contact with the conductor 72 thereby conveying a small quantity of ink along said conductor to the funnel 71 of the pen arm.

In Figs. 11 and 12 I have illustrated the manner in which the funnel may be constructed to cause as little unbalancing as possible by having the same in the form of a continuous grooved ring 81 pivoted upon the rock shaft 21 by means of the pointed screws 82.

If desired, a felt washer 83 may be placed about the stem 35 in order to close the opening in the bracket 50 and to exclude dirt and foreign matter from the dashpot 58. A soft felt washer of this character offers very slight resistance to movement of the stem 35.

The ammeter above described has a number of adjustments which are of importance. The core 34 is adjustable upon the stem 35 for changing the scale relation of the instrument. If the core is moved farther in, the scale at the outer end, that is, for larger quantities, is suppressed. This is because there is more iron within the coil for initial position, that is, weaker current strength and at the end of the scale the plunger has moved in so far that the core has approached neutral position so that the pull is less on higher current strength in proportion.

The spring 56 is adjustable to get variations of the scale. If the core is moved in to the coil 33 the spring must be weakened accordingly to secure the same deflection.

The position of the counterweight with respect to the horizontal line provides another adjustment. If the weight becomes effective toward the end of the stroke of the solenoid, it reduces the length of the scale graduation at the higher values and if this counterweight becomes less effective toward the end of the stroke, it tends to increase the length of scale graduations at the higher values and thus extend the scale.

For instance, if the arm 39 were hung vertically, the weight 38 would offer practically no resistance for the first movement of the core, but would offer maximum resistance to move it toward the end of the stroke. Thus when the core 34 is moved outward and the weight arm 39 placed in such position that it becomes more effective as the core is pulled in, a more even spacing of the scale graduation will be secured.

For zero adjustment the screw rod 60 is operated to raise the bracket 50 so that the zero or initial position of the entire moving system is changed. This zero adjustment is secured not by increasing the tension of the spring 56 to any material extent, but merely setting the moving system at a different zero position.

The sensitiveness of the system to variations may be controlled by employing oil of the proper viscosity in the dashpot 58.

To vary the pressure of the pen point 31 upon the paper dial 5 the collar 22 is moved axially along the rocking shaft 21.

The operation of the device is as follows:

The central arbor 13 is driven in a clockwise direction by the clock mechanism 15, thereby advancing the chart 5, which is attached to the arbor 13 by means of the clamp nut 14. Upon a flow of current the solenoid 33 will be energized thereby sucking the solenoid core 34 into the solenoid due to the tendency of the core to center itself therein. This movement of the core 34 is opposed and guided by the spring 56. As has been heretofore explained, the rocking shaft 21 is controlled by this movement of the solenoid core 34, the pen arm 7 being swung outwardly about the pivot member 24 upon movement of the core 34 into the soleniod. An increased flow of current moves the core farther into the solenoid and consequently swings the pen arm 7 farther outwardly about the pivot member 24, the weight 38 controlling the rise or descent of the core 34 in the coil 33, as it obviously becomes more effective as the core is moved farther into the solenoid, thereby giving greater sensitiveness and providing a scale of larger graduations. The circles 10, which in this case represent current strength, are graduated from the center outwardly so that an increased movement of the pen arm 7 outwardly, due to an increased movement of the core 34 into the solenoid will indicate an increase in the current strength upon the face of the chart 5. Thus a permanent record of the current flow will be made showing all the slight variations in the flow, the particular time at which the variations occurred being indicated by the arcuate lines 11.

I do not intend to be limited to the precise details shown and described.

I claim:

1. In a meter, an indicating element, an electromagnet for moving the indicating element, said electromagnet having a magnetic member movable in substantially a vertical line, a stem connected to said magnetic member and spring means for opposing motion of the magnetic member, said spring means holding the stem in central position out of contact with any stationary part.

2. In a meter, a movable indicating element, an electromagnet having a movable magnetic member, a stem connected to the magnetic member and the indicating element, a coil spring having one end attached to said stem and the other end secured to a stationary support, said spring opposing motion of the stem and magnetic member and guiding the stem in its movement axially to keep the same out of contact with any stationary part.

3. In combination a solenoid, a core for said solenoid, a pivoted arm, a stem connected to said pivoted arm and the core, said stem extending axially through said solenoid, a bracket below the solenoid, a coil spring fastened at one end to said bracket and fastened at its other end to the stem, said spring opposing movement of the core into the solenoid and serving as a guide for the stem and core.

4. In combination a solenoid having a core, a pivoted arm, an indicator movable therewith, a bracket below the solenoid having an opening for the stem, a stem connected to said arm and core and passing through said solenoid and said bracket, a coil spring surrounding the lower end of the stem and attached at its lower end to said stem and at its upper end to said bracket, said spring guiding the stem and solenoid out of contact with the solenoid and bracket and serving as a calibrating spring for said core.

5. In combination a solenoid having a core, a pivoted arm, an indicator movable therewith, a bracket below the solenoid having an opening for the stem, a stem connected to said arm and core and passing through said solenoid and said bracket, a coil spring surrounding the lower end of the stem and attached at its lower end to said stem and at its upper end to said bracket, said spring guiding the stem and core out of contact with the solenoid and bracket and serving as a calibrating spring for said core, and means for shifting the bracket for zero adjustment of the indicator.

6. In combination a solenoid having a core, a pivoted arm, an indicator movable therewith, a bracket below the solenoid having an opening for the stem, a stem connected to said arm and core and passing through said solenoid and said bracket, a coil spring surrounding the lower end of the stem and attached at its lower end to said stem and at its upper end to said bracket, said spring guiding the stem and solenoid out of contact with the solenoid and bracket and serving as a calibrating spring for said core, means for changing the spring tension between the stem and bracket and means for shifting the bracket for zero adjustment of the indicator.

7. In combination, a solenoid, a core, a pivoted arm, an indicator arm connected to said pivoted arm, a bracket below the solenoid having an opening therethrough in line with the axis of the solenoid, a stem connecting the pivoted arm and the core and projecting through the bracket, an adjustable head on said stem, said head being secured to the lower end of the spring, the upper end of the spring being secured to the bracket, said spring opposing motion of the core and guiding the stem out of frictional contact.

8. In combination, a solenoid, a core, a pivoted arm, an indicator arm connected to said pivoted arm, a bracket below the solenoid having an opening therethrough in line with the axis of the solenoid, a stem connecting the pivoted arm and the core and projecting through the bracket, an adjustable head on said stem, said head being secured to the lower end of the spring, the upper end of the spring being secured to the bracket, said spring opposing motion of the core and guiding the stem out of frictional contact, and means for adjusting the bracket axially with respect to the stem for zero adjustment.

9. In combination, a solenoid, a core, a pivoted arm, an indicator arm connected to said pivoted arm, a bracket below the solenoid having an opening therethrough in line with the axis of the solenoid, a stem connecting the pivoted arm and the core and projecting through the bracket, an adjustable head on said stem, said head being secured to the lower end of the spring, the upper end of the spring being secured to the bracket, said spring opposing motion of the core and guiding the stem out of frictional contact, means for adjusting the bracket laterally with respect to the stem to position the stem axially in the solenoid.

10. In combination, a solenoid having a vertical axis, a vertical core for said solenoid, a pivoted arm, said arm being inclined to the horizontal, an indicator arm connected to said pivoted arm, said indicator arm being displaced from a vertical line in the same direction as the pivoted arm is displaced from the horizontal line, a counterbalance disposed at an angle below the horizontal, and connected to said pivoted arm, a coil spring and a bracket, said coil spring being connected to said stem and to said bracket to guide the stem out of frictional contact and to oppose movement of the core of the solenoid.

11. In combination, a vertical solenoid having a core, a pivoted arm, an indicator connected to said pivoted arm, a bracket, a stem connecting the pivoted arm and the core and a spring connected between the bracket and the stem, said spring opposing movement of the core into the solenoid, a casing for inclosing the above parts and means for vertically shifting the bracket to change the zero setting of the indicator arm, said means having a part adapted to be manually operated projecting outside of the casing.

12. In combination, a base plate, a solenoid mounted in a vertical position on said base plate, a core for the solenoid, a pivoted arm supported on said base plate, an indicator arm connected to said pivoted arm, a bracket movably mounted upon the base plate, a stem connecting the core and pivoted arm and projecting through said bracket, a helical spring connected between the stem and the bracket, said spring holding the stem out of frictional engagement and opposing movement of the solenoid core, means for changing the spring tension of said spring, and an adjusting screw for adjusting said bracket on said base plate for zero adjustment of the indicator arm.

13. In a device of the class described, a base plate, an electro-magnet, a horizontal shaft adapted to be moved angularly by said electro-magnet supporting pivots mounted on said base plate for supporting said horizontal shaft at substantially right angles to the base plate, a pen arm having a yoke at its upper end and a pivot pin passing through said yoke and secured to said shaft and a pen or stylus at the lower end of said pen arm adapted to engage a recording surface, said pen and arm having their center of weight slightly out of a vertical plane with respect to the pivot pin.

14. In combination, a base plate, a platen, a movable dial on said platen, a horizontal shaft pivoted for rotation, supporting pivots mounted on said base plate for supporting the opposite ends of said horizontal shaft, the axis of said horizontal shaft lying in a plane substantially parallel to the axis of the platen, said horizontal shaft projecting forward from the platen, a pen arm having a pen at its lower end, said pen arm being pivoted on an axis substantially at right angles to the axis of the platen, said pen and arm being hung slightly out of the vertical plane with respect to the pivot pin to cause the pen point to press against the movable dial.

15. In combination, a horizontal shaft pivoted for rotation, a base plate, supporting pivots for said shaft, a platen, a movable dial on said platen, said shaft projecting forward from the platen, a pen arm having a pen at its lower end, said pen arm being pivoted on an axis substantially at right angles to the shaft, said pen and arm being hung slightly out of a vertical plane to cause the pen point to press against the movable dial, time controlled means for advancing said dial and means controlled by said time controlled means for periodically feeding ink to said pen.

16. In combination, a vertical dial, a horizontal rocking shaft, a depending pen arm having a pen, said pen arm being pivoted to the rocking shaft on an axis substantially at right angles to the axis of the rocking shaft, said pen arm being hollow and having a receiving funnel at its upper end, a clock mechanism for advancing the dial, an ink reservoir, and means controlled by the clock mechanism for periodically feeding ink from the reservoir to the pen.

17. In combination, a stationary platen, a central arbor projecting through said platen, said arbor having a shoulder substantially flush with the outer face of said platen, a clamp nut for said arbor, a paper dial adapted to lie flat against the platen, said dial being secured between the shoulder provided on said arbor and said clamp nut, a depending arm having a pen adapted to engage said movable dial, guiding means for the periphery of the movable dial, said guiding means being mounted upon said stationary platen and including a guiding finger substantially in line with the pen and arbor for holding the dial at the place where the pen engages the same.

18. In combination, a horizontal shaft, a depending pen arm pivoted at right angles to said rock shaft, said pen arm being hollow and having a yoke, a pen adapted to be fed by the hollow pen arm, said yoke forming a funnel and means physically out of contact with the yoke for periodically dropping ink into said yoke.

19. In combination, a solenoid having a core, a stem secured to the core, a bracket, said stem passing through an opening in the bracket, a dash pot secured to said bracket, a spring adjustably secured to said core and to said bracket, said stem having a piston member for the dash pot connected to said spring.

20. In combination, a base plate, a solenoid mounted on the base plate, a core for the solenoid, a stem for said core, a bracket mounted on the base plate, a helical spring connected to said bracket and encircling the lower end of said stem, a piston member adjustably connected to said stem, a spring connected between the bracket and said piston member, a dashpot secured to said bracket and means for adjusting the position of said bracket with respect to said base plate and solenoid.

21. In a meter, an indicating element, an electromagnet for moving the indicating element, said electromagnet having a magnetic member movable in substantially a vertical line, a stem connected to said magnetic member and spring means for opposing motion of the magnetic member, said spring means holding the stem in central position out of contact with any stationary part and opposing motion of the magnetic member, said magnetic member being adjustable along said stem for varying the pull of the electromagnet thereupon.

22. In combination, a solenoid having a core, a pivoted arm, an indicator movable with said pivoted arm, a bracket below the solenoid having an opening for the stem, a stem connected to said arm and to said core and passing through said solenoid and said bracket, a coil spring surrounding the lower end of the stem and attached at its lower end to said stem and at its upper end to said bracket, said spring guiding the stem and core out of contact with the solenoid and bracket and serving as a graduating spring for said core, said core being adjustable on said stem in and out of the solenoid for varying the pull of the solenoid upon the core.

23. In combination, a solenoid, a core, a pivoted arm, an indicator arm connected to said pivoted arm, a bracket below the solenoid having an opening therethrough in line with the axis of the solenoid, a stem connecting the pivoted arm and the core and projecting through the bracket, an adjustable head on said stem, said head being secured to the lower end of the spring, the upper end of the spring being secured to the bracket, said spring opposing motion of the core and guiding the stem out of frictional contact, and means for adjusting the bracket axially with respect to the stem for zero adjustment, said core being adjustable along said stem to control its position in the solenoid and to govern the pull of the solenoid upon said core.

24. In combination, a horizontal shaft pivoted for rotation, a base plate, supporting pivots for said shaft, a platen, a movable dial on said platen, said shaft projecting forward from the platen, a pen arm having a pen at its lower end, said pen arm being pivoted on an axis substantially at right angles to the shaft, said pen and arm being hung slightly out of a vertical plane with respect to the axis of the pen to cause the pen point to press against the movable dial, time controlled means for advancing said dial and time controlled means for periodically feeding ink to said pen.

25. In combination, a vertical dial, a horizontal rocking shaft, a depending pen arm having a pen, said pen arm being pivoted to the rocking shaft on an axis substantially at right angles to the axis of the rocking shaft, said pen arm being hollow and having a receiving funnel at its upper end, a clock mechanism for advancing the dial, an ink reservoir and time controlled means for periodically feeding ink from the reservoir to the pen.

In witness whereof, I hereunto subscribe my name this 10th day of October, A. D. 1917.

JOHN A. OBERMAIER.